(12) United States Patent
Yoo et al.

(10) Patent No.: US 9,197,280 B1
(45) Date of Patent: Nov. 24, 2015

(54) RADIO FREQUENCY SWITCH

(71) Applicant: SAMSUNG ELECTRO-MECHANICS CO., LTD., Suwon-Si (KR)

(72) Inventors: Hyun Hwan Yoo, Suwon-Si (KR); Jong Myeong Kim, Suwon-Si (KR); Hyun Jin Yoo, Suwon-Si (KR); Yoo Sam Na, Suwon-Si (KR); Yoo Hwan Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/604,578

(22) Filed: Jan. 23, 2015

(30) Foreign Application Priority Data

May 9, 2014 (KR) .......................... 10-2014-0055741

(51) Int. Cl.
*H04B 1/44* (2006.01)
*H04B 1/48* (2006.01)

(52) U.S. Cl.
CPC ............ *H04B 1/48* (2013.01); *H04B 2001/485* (2013.01)

(58) Field of Classification Search
CPC .................................. H04B 1/006; H04B 1/00
USPC ............................ 455/78, 77, 333, 338, 550.1
See application file for complete search history.

(56) References Cited

U.S. PATENT DOCUMENTS

| | | | | |
|---|---|---|---|---|
| 7,123,898 B2* | 10/2006 | Burgener et al. | ............. | 455/333 |
| 7,796,969 B2* | 9/2010 | Kelly et al. | .................. | 455/333 |
| 8,432,016 B1* | 4/2013 | Kerr | ............................... | 257/506 |
| 8,583,111 B2* | 11/2013 | Burgener et al. | ............. | 455/433 |
| 8,723,260 B1* | 5/2014 | Carroll et al. | ................. | 257/347 |
| 2007/0018247 A1* | 1/2007 | Brindle et al. | ................. | 257/347 |
| 2007/0243849 A1 | 10/2007 | Prikhodko et al. | | |
| 2009/0073078 A1 | 3/2009 | Ahn et al. | | |
| 2010/0277252 A1* | 11/2010 | Gorbachov | ................... | 333/104 |
| 2011/0221519 A1* | 9/2011 | Katoh et al. | .................. | 327/558 |
| 2012/0064836 A1* | 3/2012 | Bauwelinck et al. | ........... | 455/73 |
| 2012/0154017 A1 | 6/2012 | Sugiura et al. | | |
| 2012/0262217 A1* | 10/2012 | Gorbachov et al. | ........... | 327/382 |
| 2013/0215808 A1* | 8/2013 | Muthukrishnan et al. | .... | 370/297 |
| 2014/0062575 A1* | 3/2014 | Hurwitz | ........................ | 327/379 |

FOREIGN PATENT DOCUMENTS

KR 10-2009-0028446 A 3/2009
KR 10-2012-0069525 A 6/2012

* cited by examiner

*Primary Examiner* — Marceau Milord
(74) *Attorney, Agent, or Firm* — NSIP Law

(57) ABSTRACT

A radio frequency switch may include: a common port transmitting and receiving a radio frequency signal; a receive switch unit including a first switch unit having a plurality of first switch elements and a second switch unit having a plurality of second switch elements; and a transmit switch unit including a third switch unit having a plurality of third switch elements and a fourth switch unit having a plurality of fourth switch elements. The receive switch unit may further include a plurality of first capacitors connected between a first terminal and a body terminal of each of the plurality of first switch elements. The transmit switch unit may further include a plurality of second capacitors connected between a second terminal and a body terminal of each of the plurality of third switch elements.

11 Claims, 14 Drawing Sheets

RADIO FREQUENCY SWITCH

CROSS-REFERENCE TO RELATED APPLICATION

This application claims the benefit of Korean Patent Application No. 10-2014-0055741, filed on May 9, 2014, with the Korean Intellectual Property Office, the disclosure of which is incorporated in its entirety herein by reference.

BACKGROUND

Some exemplary embodiments of the present disclosure may relate to a radio frequency switch.

In accordance with developments in wireless communications technologies, various communications standards have been simultaneously adopted. In addition, in accordance with the miniaturization of wireless communications modules and improvements in the performance of portable terminals, the application of a plurality of communication standards to a single portable terminal has been demanded. Therefore, an amount of frequency bands supported by a single cellular phone has increased.

In a cellular area, fourth-generation (4G) communications schemes, such as Long Term Evolution (LTE), have been widely applied in addition to existing second-generation (2G) and third-generation (3G) communications technologies. In a Wi-Fi area, a new market has been established by adding the IEEE 802.11ac standard to the existing IEEE 802.11b/g/n standard.

In accordance with this trend, supporting various frequency bands in a radio frequency (RF) front end field has also been demanded. For example, it has been demanded to support various frequency bands with respect to a radio frequency switch positioned on a signal path between an antenna and an RF chipset. Therefore, a single pole double throw (SPDT) type switch has been used in various fields.

The switch elements of the radio frequency switch used for the multi-band as described above, particularly, in a Global System for Mobile Communications (GSM) standard may need high power handling characteristics and low harmonic characteristics. Generally, in order to increase power handling characteristics of the radio frequency switch, several switch elements may be stacked and used. However, in the case where an input signal power is large, an abnormal channel may formed in the switch elements which are multi-stacked on an off-path, such that a leakage may occur. In addition, this may lead to degradation of harmonic characteristic.

RELATED ART DOCUMENT (Patent Document 1) U.S. Patent Application Publication No. 2007/0243849

SUMMARY

Some exemplary embodiments of the present disclosure may provide a radio frequency switch capable of improving secondary harmonic characteristics by including at least one switch element including a feed-forward capacitor connected between a source/drain and a body terminal.

According to an aspect of the present disclosure, a radio frequency switch may include: a common port transmitting and receiving a radio frequency signal; a receive switch unit including a first switch unit having a plurality of first switch elements which are connected to each other in series and a second switch unit having a plurality of second switch elements which are connected to each other in series; and a transmit switch unit including a third switch unit having a plurality of third switch elements which are connected to each other in series and a fourth switch unit having a plurality of fourth switch elements which are connected to each other in series. The receive switch unit may further include a plurality of first capacitors connected between a first terminal and a body terminal of each of the plurality of first switch elements. The transmit switch unit may further include a plurality of second capacitors connected between a second terminal and a body terminal of each of the plurality of third switch elements.

According to another aspect of the present disclosure, a radio frequency switch may include: a common port transmitting and receiving a radio frequency signal; a receive switch unit having a plurality of first switch elements which are connected to each other in series and conducting or blocking a signal transfer path between a receive port, inputting and outputting the radio frequency signal, and the common port; and a transmit switch unit having a plurality of second switch elements which are connected to each other in series and conducting or blocking a signal transfer path between a transmit port, inputting and outputting the radio frequency signal, and the common port. The receive switch unit may further include a plurality of first capacitors coupled between a first terminal and a body terminal of each of the plurality of first switch elements. The transmit switch unit may further include a plurality of second capacitors coupled between a second terminal and a body terminal of each of the plurality of second switch elements.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
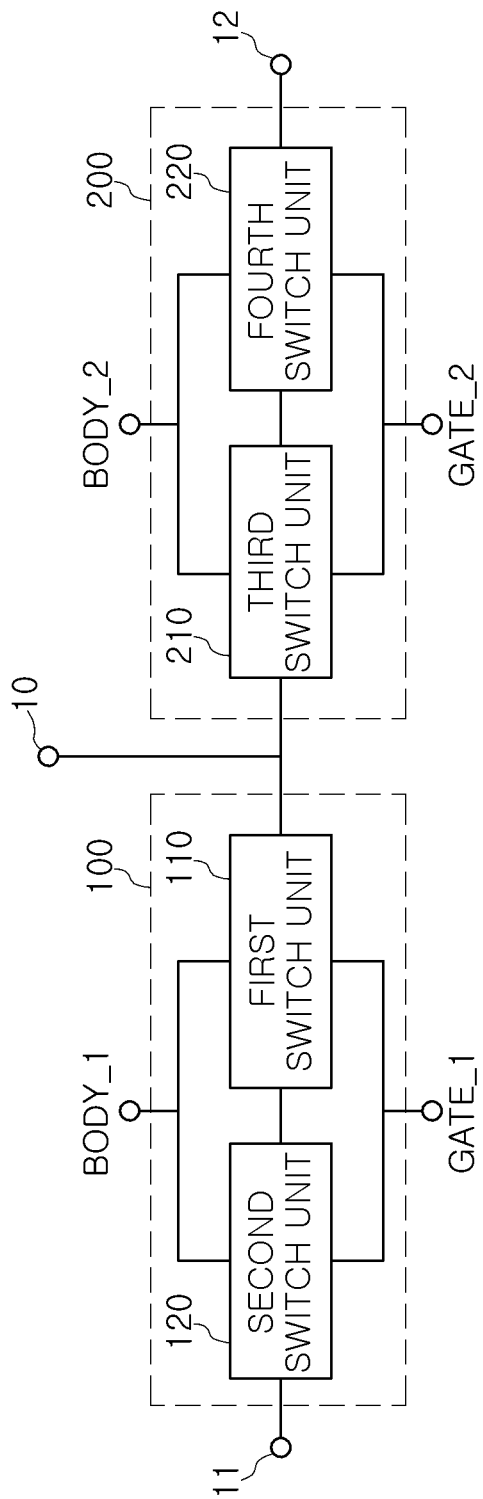
FIG. 1 is a block diagram illustrating a radio frequency switch according to an exemplary embodiment in the present disclosure.

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

Throughout the drawings, the same or like reference numerals will be used to designate the same or like elements.

FIG. 1 is a block diagram illustrating a radio frequency switch according to an exemplary embodiment in the present disclosure.

Referring to FIG. 1, a radio frequency switch according to the exemplary embodiment in the present disclosure may include a common port 10, a receive switch unit 100, and a transmit switch unit 200.

The common port 10 may be connected to an antenna and transmit or receive a radio frequency signal.

The receive switch unit 100 may be connected between the common port 10 and a receive port 11. In addition, the receive switch unit 100 may include a first switch unit 110 and a second switch unit 120.

The first switch unit 110 may be connected to be closer to the common port 10 than the second switch unit 120. The first switch unit 110 may include a plurality of first switch elements connected to each other in series, but not limited thereto. The second switch unit 120 may be connected between the first switch unit 110 and the receive port 11. The second switch unit 120 may include a plurality of second switch elements connected in series with each other, but not limited thereto.

Examples of the plurality of first and second switch elements may be a metal oxide silicon field effect transistor (MOSFET) and a bipolar junction transistor (BJT), but not limited thereto. Hereinafter, a case in which the MOSFETs are used as the first and second switch elements will be described by way of example.

In this case, the number of MOSFETs configuring the first switch unit 110 and the second switch unit 120 may be appropriately changed depending on a withstand voltage required for the receive switch unit 100. In addition, each of the MOSFETs may have a source terminal and a drain terminal, which may not be distinguished from each other from a structure of the MOSFET.

Therefore, in the present disclosure, when the MOSFETs are connected to each other in series, any one of source and drain terminals of one MOSFET is connected to any one of source and drain terminals of another MOSFET.

Meanwhile, the receive switch unit 100 may further include a plurality of first capacitors C1 connected between a first terminal of the first switch element and a body terminal corresponding to the first terminal. In this case, the first terminal of the first switch element may be, for example, but not limited to, a source of the first switch element. A description thereof will be provided in detail with reference to FIG. 2.

Figure 2:
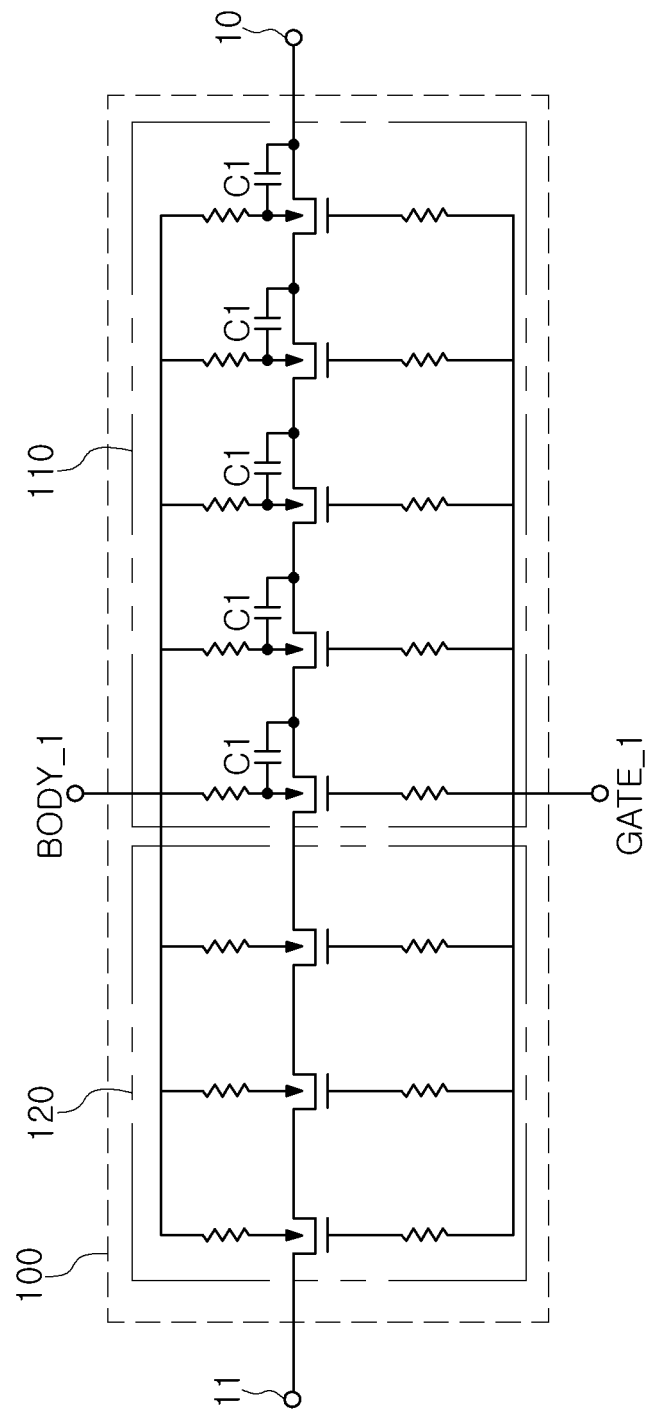
FIG. 2 is a circuit diagram illustrating a receive switch unit among configurations of the radio frequency switch illustrated in FIG. 1 in more detail.

FIG. 2 is a circuit diagram illustrating an exemplary embodiment of the receive switch unit 100 among configurations of the radio frequency switch illustrated in FIG. 1 in more detail.

Referring to FIG. 2, the first and second switch units 110 and 120 may further include a plurality of body resistor elements which may be connected in series to body terminals of the plurality of first and second switch elements. For example, the plurality of first and second switch elements may be connected to a first common body terminal (BODY_1) through the plurality of body resistor elements.

That is, the plurality of first and second switch elements may be body contact type field effect transistors (FETs), wherein the body resistor element may reduce loss due to leakage power from a body region.

A gate of each of the first and second switch elements may have a first resistor element connected in series thereto. In this case, the gate of each of the first and second switch elements may be connected to a first common control terminal (GATE_1) through the first resistor elements and receive a control signal.

Meanwhile, as described above, the receive switch unit 100 may further include the plurality of first capacitors C1 connected between the first terminal (source) of the first switch element and the body terminal corresponding to the first terminal. That is, the plurality of first capacitors C1 may be coupled between the source and the body terminal of the first switch element.

As a result, a voltage difference between the source and the body terminal of the first switch element may be reduced, whereby a voltage unbalance may be reduced and secondary harmonic characteristic may be improved.

Meanwhile, the first switch unit 110 and the second switch unit 120 may perform a switching operation by receiving the control signal from the first common control terminal (GATE_1), and more particularly, may conduct/connect or block a signal transfer path between the receive port 11 and the common port 10.

For instance, in a receive mode, both the first and second switch elements may be turned-on to conduct the signal transfer path between the receive port 11 and the common port 10, and in a transmit mode, both the first and second switch elements may be turned-off to block the signal transfer path between the receive port 11 and the common port 10.

Referring to again FIG. 1, the transmit switch unit 200 may be connected between the common port 10 and the transmit port 12. In addition, the transmit switch unit 200 may include a third switch unit 210 and a fourth switch unit 220.

The third switch unit 210 may be connected to be closer to the common port 10 than the fourth switch unit 220. The third switch unit 210 may include a plurality of third switch elements connected to each other in series. The fourth switch unit 220 may be connected between the third switch unit 210 and the transmit port 12. The fourth switch unit 220 may include a plurality of fourth switch elements connected to each other in series.

Examples of the plurality of third and fourth switch elements may be the MOSFET and the BJT. Hereinafter, a case the MOSFETs are used as the first and second switch elements will be described by way of example.

In this case, the number of MOSFETs configuring the third switch unit 210 and the fourth switch unit 220 may be appropriately changed depending on a withstand voltage required for the transmit switch unit 200. In addition, each of the MOSFETs may have a source terminal and a drain terminal, which may be not distinguished from each other from a structure of the MOSFET.

Meanwhile, the transmit switch unit 200 may further include a plurality of second capacitors C2 connected between a second terminal of the third switch element and a body terminal corresponding to the second terminal. In this case, the second terminal of the third switch element may be, for instance, but not limited to, a drain of the third switch element. A description thereof will be provided in detail with reference to FIG. 3.

Figure 3:
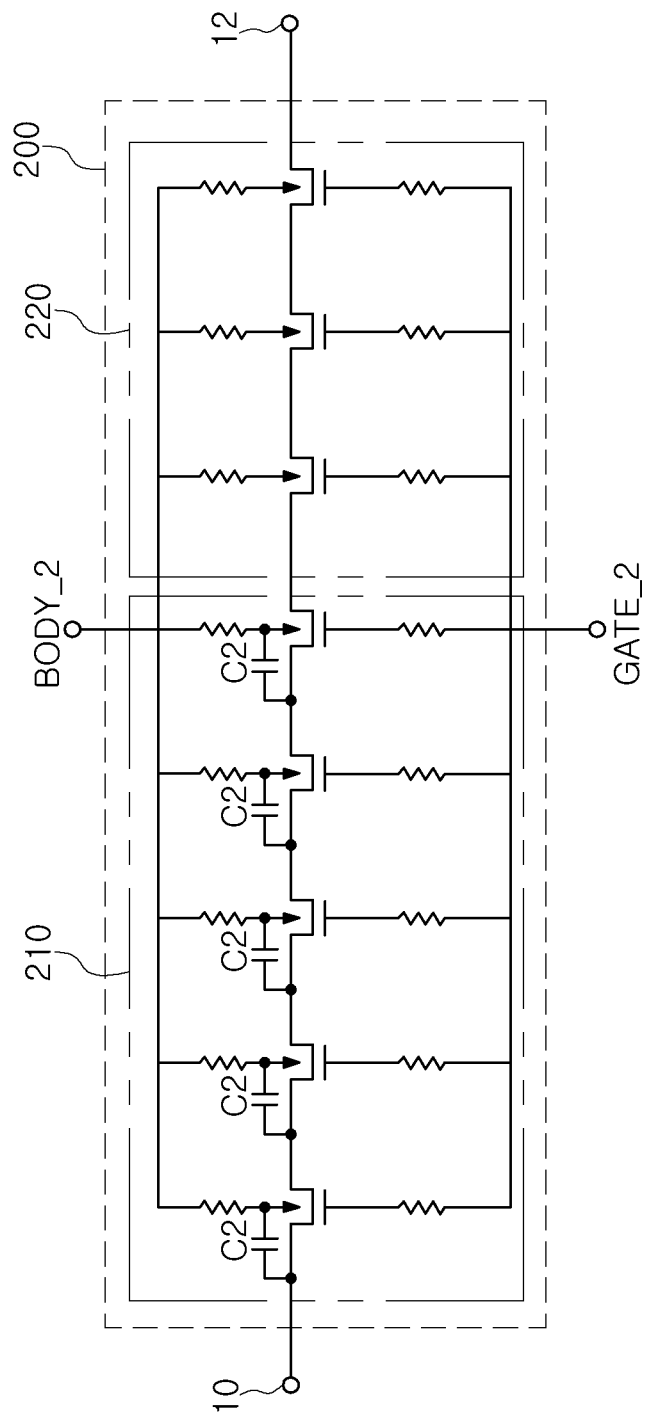
FIG. 3 is a circuit diagram illustrating a transmit switch unit among the configurations of the radio frequency switch illustrated in FIG. 1 in more detail.

FIG. 3 is a circuit diagram illustrating the transmit switch unit 200 among the configurations of the radio frequency switch illustrated in FIG. 1 in more detail.

Referring to FIG. 3, the third and fourth switch units 210 and 220 may further include a plurality of body resistor elements which may be connected in series to body terminals of the plurality of third and fourth switch elements. In this case, the plurality of third and fourth switch elements may be connected to a second common body terminal (BODY_2) through the plurality of body resistor elements.

For example, the plurality of third and fourth switch elements may be body contact type FETs, wherein the body resistor elements may reduce loss due to leakage power from a body region, which is similar to that described above.

A gate of each of the plurality of third and fourth switch elements may have a second resistor element connected in series thereto. In this case, the gate of each of the plurality of third and fourth switch elements may be connected to a second common control terminal (GATE_2) through the plurality of second resistor elements and receive a control signal.

Meanwhile, as described above, the transmit switch unit 200 may further include the plurality of second capacitors C2 connected between the second terminal (drain) of the third switch element and the body terminal corresponding to the second terminal. That is, the plurality of second capacitors C2 may be coupled between the drain and the body terminal of the second switch element.

As a result, a voltage difference between the drain and the body terminal of the second switch element may be reduced, whereby a voltage unbalance may be reduced and secondary harmonic characteristic may be improved.

Meanwhile, the third switch unit 210 and the fourth switch unit 220 may perform a switching operation by receiving the control signal from the second common control terminal (GATE_2), and more particularly, may conduct/connect or block a signal transfer path between the transmit port 12 and the common port 10.

For instance, in a transmit mode, both of the third and fourth switch elements may be turned-on to conduct/connect the signal transfer path between the transmit port 12 and the common port 10, and in a receive mode, both of the first and second switch elements may be turned-off to block the signal transfer path between the transmit port 12 and the common port 10.

Figure 4:
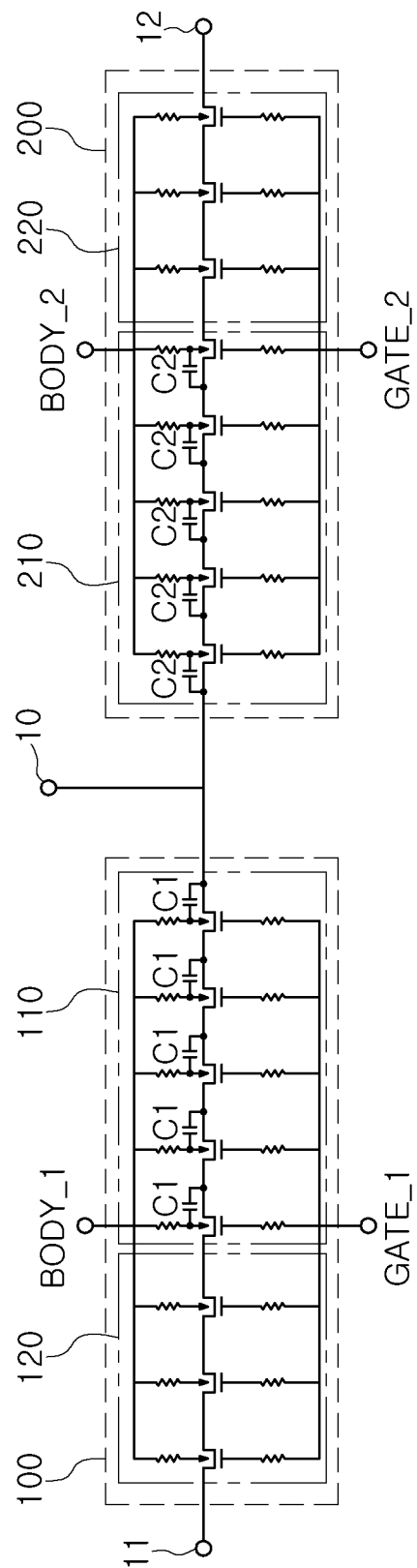
FIG. 4 is a circuit diagram illustrating the radio frequency switch illustrated in FIG. 1 in more detail.

FIG. 4 is a circuit diagram illustrating the radio frequency switch illustrated in FIG. 1 in more detail.

Referring to FIG. 4, as described above, the receive switch unit 100 may include the plurality of first capacitors C1 connected between the body terminals and the sources of the plurality of first switch elements. In addition, the transmit switch unit 200 may include the plurality of second capacitors C2 connected between the body terminals and the drains of the plurality of third switch elements.

The receive switch unit 100 may reduce, for example, but not limited to the voltage difference between the source and the body terminal of the first switch element to thereby reduce the voltage unbalance by including the first switch unit 110 in which the plurality of first switch elements having the first capacitor C1 connected between the body terminal and the source may be connected to each other in series.

Similarly, the transmit switch unit 200 may reduce, for instance, but not limited to, the voltage difference between the drain and the body terminal of the third switch element to thereby reduce the voltage unbalance by including the second switch unit 220 in which the plurality of third switch elements having the second capacitor C2 connected between the body terminal and the drain are connected to each other in series.

As a result, the radio frequency switch according to the embodiments of the present disclosure may improve secondary harmonic characteristic. A description thereof will be described with reference to FIGS. 5A through 7.

Figure 5A:
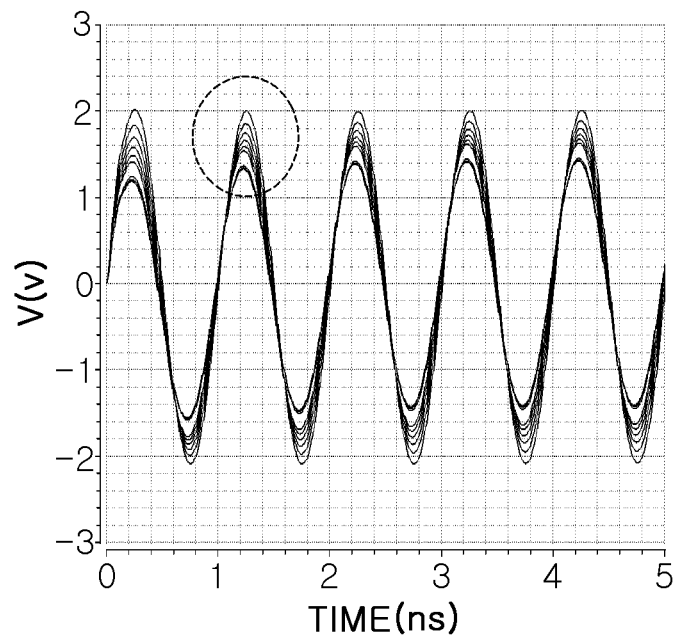
FIG. 5A is a graph illustrating voltage distribution of each of a plurality of switch elements in a radio frequency switch according to one exemplary embodiment of the present disclosure.

FIG. 5A is a graph illustrating voltage distribution of each of a plurality of switch elements in a radio frequency switch according to one exemplary embodiment of the present disclosure.

Figure 5B:
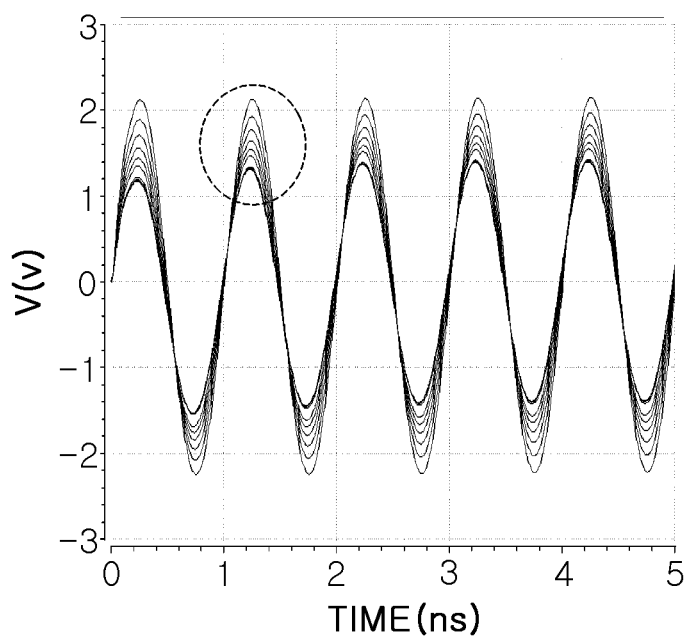
FIG. 5B is a graph illustrating voltage distribution of each of a plurality of switch elements in a radio frequency switch according to another exemplary embodiment in the present disclosure.

FIG. 5B is a graph illustrating voltage distribution of each of a plurality of switch elements in a radio frequency switch according to another exemplary embodiment in the present disclosure.

Referring to FIG. 5A, the radio frequency switch having no capacitor connected between the source/drain and the body terminal of the switch element, it may be appreciated that voltage distribution between the plurality of switch elements configuring the receive switch unit (or the transmit switch unit) may be ununiform.

On the contrary, referring to FIG. 5B, in the radio frequency switch according to the embodiment of the present disclosure, it may be appreciated that the voltage distribution between the plurality of first to fourth switch elements may be uniform.

Figure 6A:
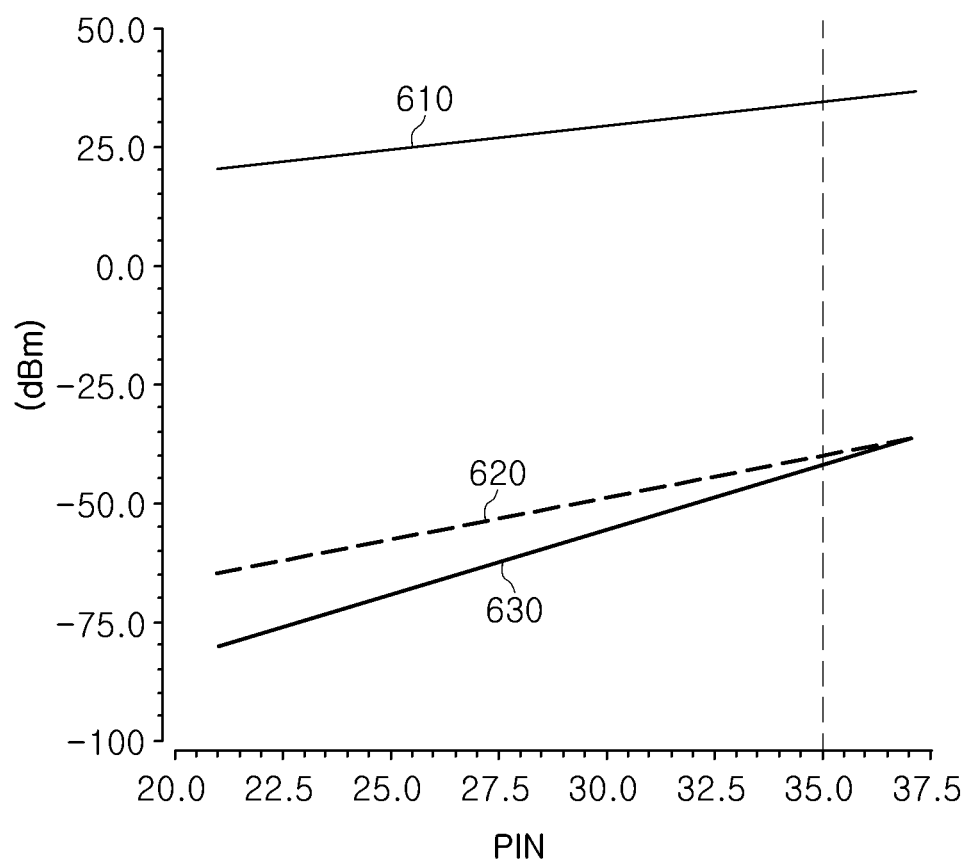
FIG. 6A is a graph illustrating secondary harmonic characteristic in the radio frequency switch according to one exemplary embodiment of the present disclosure.

FIG. 6A is a graph illustrating secondary harmonic characteristic in the radio frequency switch according to one exemplary embodiment of the present disclosure.

Figure 6B:
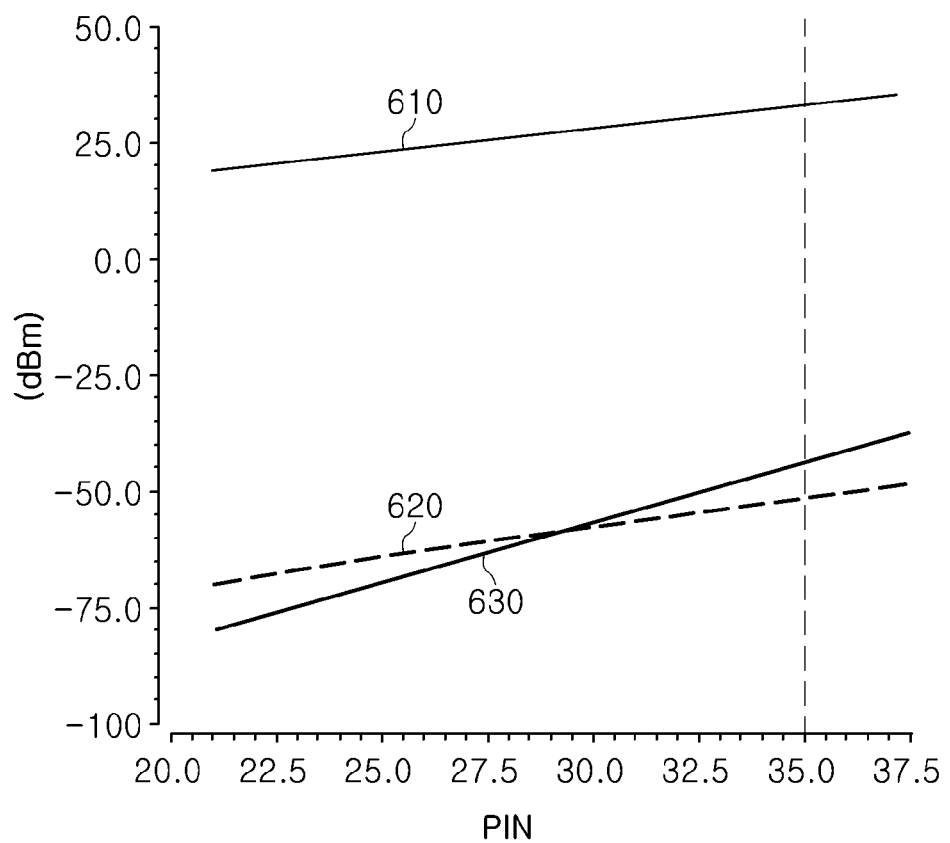
FIG. 6B is a graph illustrating secondary harmonic characteristic in the radio frequency switch according to another exemplary embodiment in the present disclosure.

FIG. 6B is a graph illustrating secondary harmonic characteristic in the radio frequency switch according to another exemplary embodiment in the present disclosure.

The radio frequency switch of FIG. 6A has no capacitor connected between the source/drain and the body terminal of the switch element.

On the contrary, referring to FIG. 6A, it may be appreciated that the radio frequency switch according to the embodiment of the present disclosure may improve secondary harmonic characteristic by −10 dBm or more from −40 dBm to −50 dBm as compared to the radio frequency switch according to the embodiment illustrated in FIG. 6A.

Figure 7:
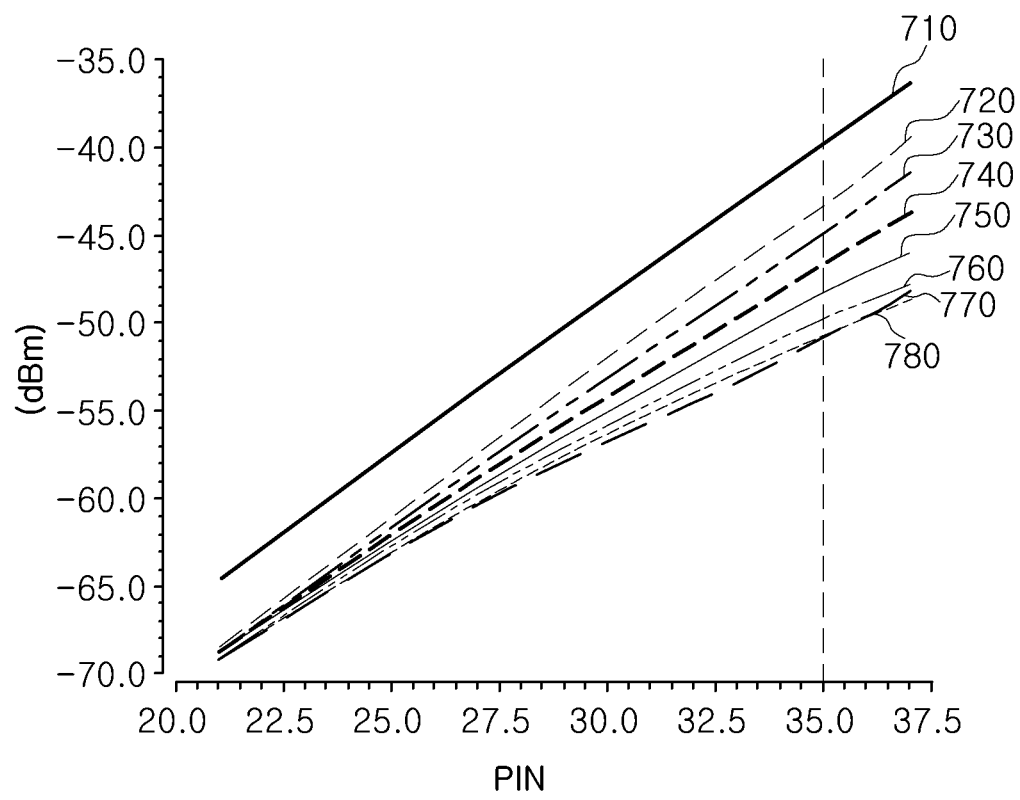
FIG. 7 is a graph illustrating secondary harmonic characteristic according to the number of switch elements having a capacitor connected between a source/drain and a body terminal among configurations of the radio frequency switch according to an exemplary embodiment in the present disclosure.

FIG. 7 is a graph illustrating secondary harmonic characteristic according to the number of switch elements having a capacitor connected between the source/drain and the body terminal among configurations of the radio frequency switch according to an exemplary embodiment in the present disclosure.

Referring to FIG. 7, as lines illustrated in the graph come down from an uppermost solid line 710 to a lowest dashed line 780, the number of the first switch elements having the first capacitors C1 connected thereto (or the third switch elements having the second capacitors C2 connected thereto) which are connected to each other in series is increased.

For example, comparing the case 710 in which the number of first switch elements having the first capacitor C1 connected thereto is 1 and the case 770 in which the number of first switch elements having the first capacitor C1 connected thereto is 7 with each other, it may be appreciated that the case 770 in which the number of first switch elements having the first capacitor C1 connected thereto is 7 may have relatively improved secondary harmonic characteristic as compared to the case 710 in which the number of first switch elements having the first capacitor C1 connected thereto is 1.

Therefore, it may be appreciated that the radio frequency switch according to the exemplary embodiment of the present disclosure may improve secondary harmonic characteristic as the number of first switch elements having the first capacitors C1 connected thereto is increased.

Figure 8:
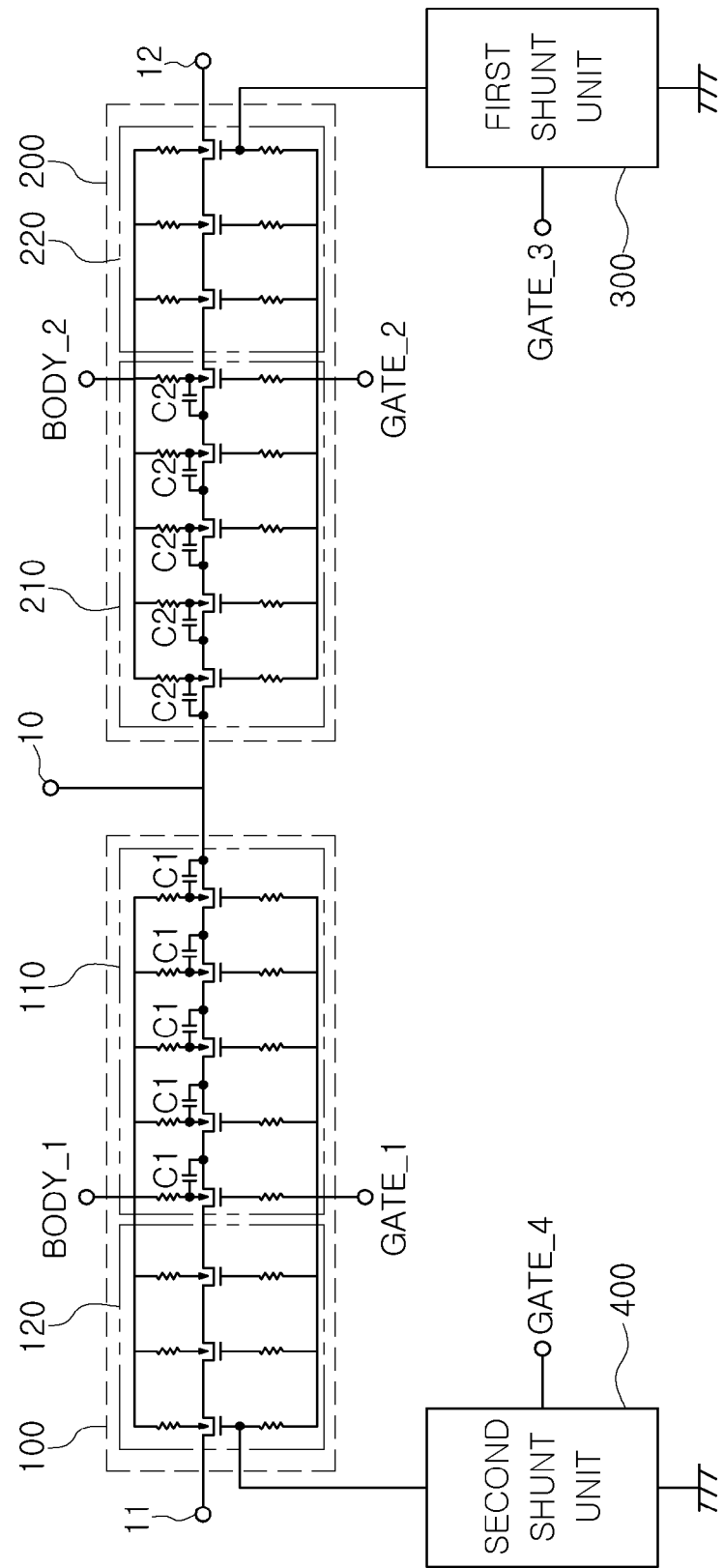
FIG. 8 is a block diagram illustrating a radio frequency switch comprising a shunt unit according to an exemplary embodiment in the present disclosure.

FIG. 8 is a block diagram illustrating a radio frequency switch comprising a shunt unit according to an exemplary embodiment of the present disclosure.

Referring to FIG. 8, the high frequency switch or the radio frequency switch according to the present disclosure may further include a first shunt unit 300 and a second shunt unit 400.

The first shunt unit 300 may be connected to a control terminal of a fourth switch element which may be connected to be the closest to the transmit port 12 among a plurality of fourth switch elements. In addition, the first shunt unit 300 may conduct or block a signal transfer path between the transmit port 12 and the ground.

For instance, the first shunt unit 300 may receive the same control signal as a control signal, applied to a first common control terminal (GATE_1) of the receive switch unit 100, from a third common control terminal (GATE_3) to thereby perform a switching operation.

The second shunt unit 400 may be connected to a control terminal of a second switch element which may be connected to be the closest to the receive port 11 among the plurality of second switch elements. In addition, the second shunt unit 400 may conduct or block a signal transfer path between the receive port 11 and the ground.

For example, the second shunt unit 400 may receive the same control signal as a control signal, applied to a second common control terminal (GATE_2) of the transmit switch unit 200, from a fourth common control terminal (GATE_4) to thereby perform a switching operation.

Figure 9:
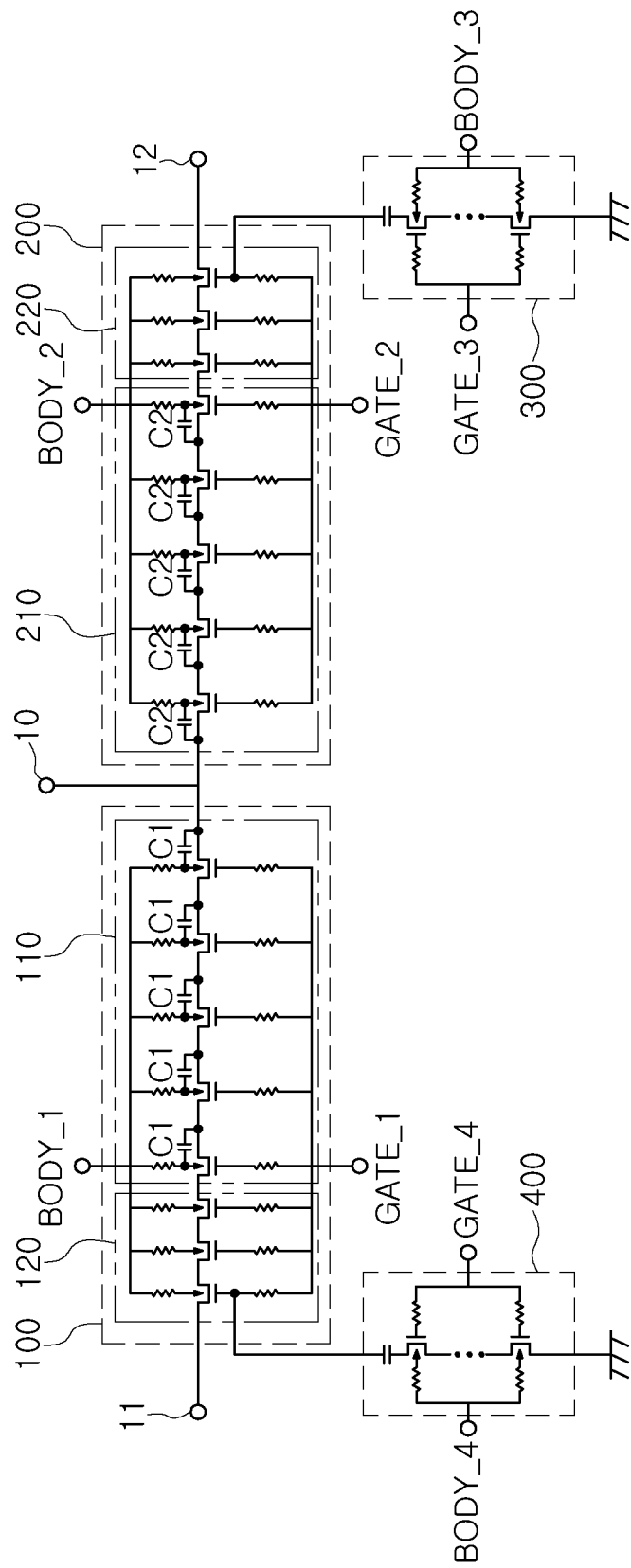
FIG. 9 is a circuit diagram illustrating the radio frequency switch illustrated in FIG. 8 in more detail.

FIG. 9 is a circuit diagram illustrating the radio frequency switch illustrated in FIG. 8 in more detail according to an exemplary embodiment of the present disclosure.

Referring to FIG. 9, the first shunt unit 300 may include one or a plurality of switch elements which may be connected to each other in series. In this case, each of the switch elements included in the first shunt unit 300 may be, for example, but not limited to a body contact type of switch element in which a body resistor element is connected to the body terminal of the fourth switch element.

Meanwhile, the second shunt unit 400 may include one or a plurality of switch elements which may be connected to each other in series. In this case, each of the switch elements included in the second shunt unit 400 may be, for instance, but not limited to, a body contact type of switch element in which a body resistor element is connected to the body terminal of the second switch element.

In the radio frequency switch according to the exemplary embodiment of the present disclosure, the second and first shunt units 400 and 300 may be connected to the receive and transmit switch units 100 and 200, respectively, whereby isolation characteristic may be improved. A description thereof will be provided with reference to FIG. 10.

Figure 10:
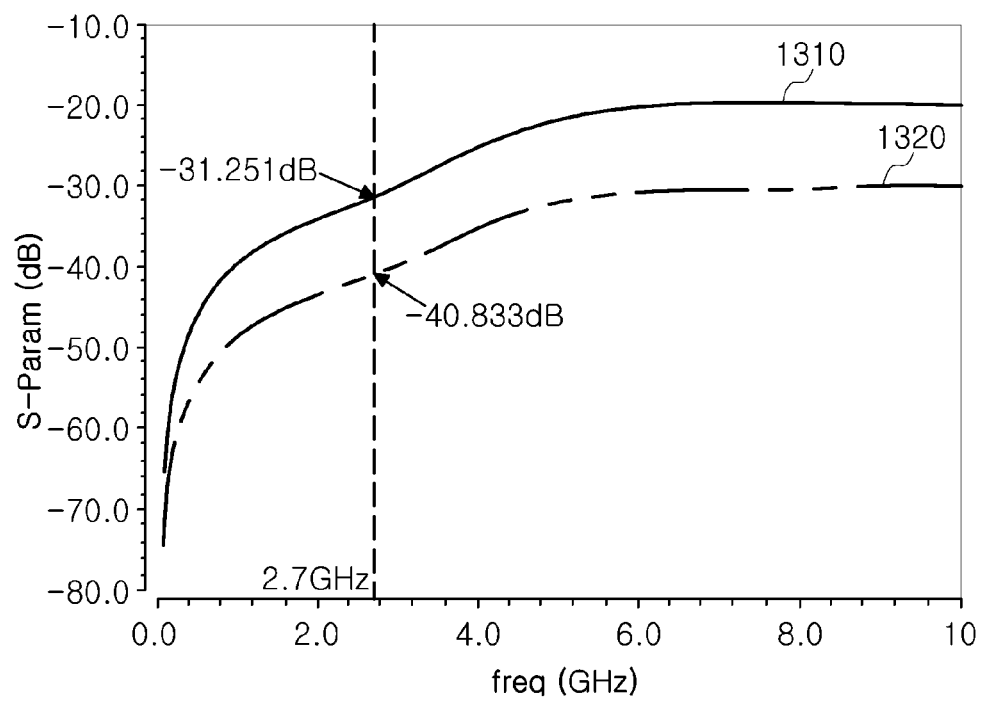
FIG. 10 is a graph illustrating isolation characteristic in the radio frequency switch illustrated in FIG. 9.

FIG. 10 is a graph illustrating isolation characteristic in the radio frequency switch illustrated in FIG. 9.

Referring to FIG. 10, it may be appreciated that the case 1320 in which the radio frequency switch includes the first and second shunt units 300 and 400 to secure isolation characteristic between the receive port 11 and the transmit port 12 may have more improved isolation characteristic than the case 1310 in which the radio frequency switch does not include the first and second shunt units 300 and 400.

For example, this may be appreciated by the graph of FIG. 10 that the case 1320 in which the radio frequency switch includes the first and second shunt units 300 and 400 corresponds to −40.833 dB at a portion of a frequency band of 2.7 GHz while the case 1310 in which the radio frequency switch does not include the first and second shunt units 300 and 400 corresponds to −31.25 dB.

Figure 11:
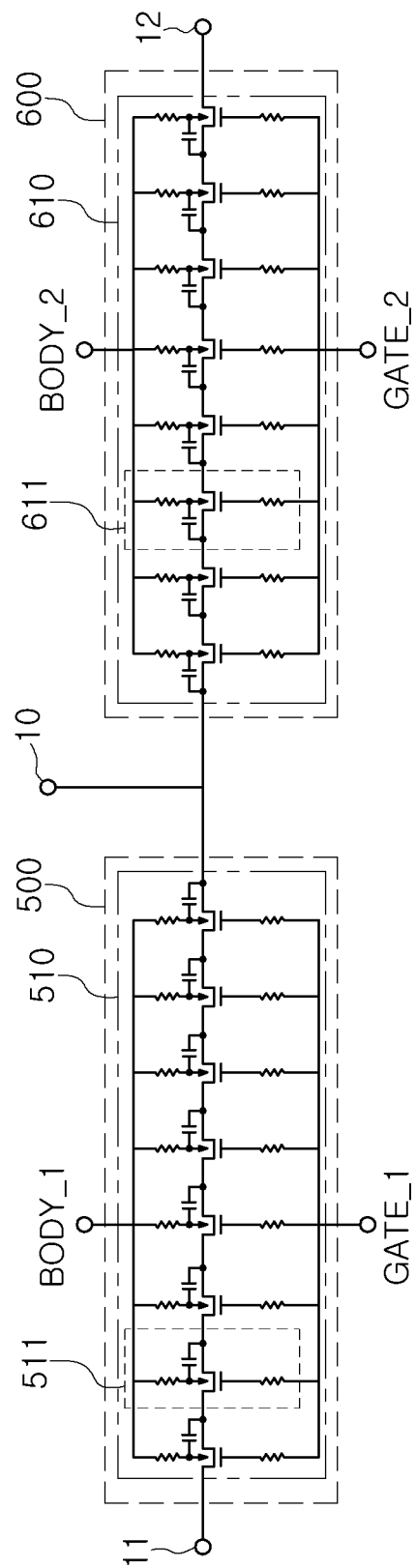
FIG. 11 is a circuit diagram illustrating a radio frequency switch according to another exemplary embodiment in the present disclosure.

Referring to FIG. 11, the radio frequency switch according to another exemplary embodiment in the present disclosure may include a receive switch unit 500 and a transmit switch unit 600. The receive switch unit 500 may have a plurality of first switch elements 510 which may be connected to each other in series. The transmit switch unit 600 may have a plurality of second switch elements 610 which may be connected to each other in series.

In this case, the receive switch unit 500 may further include a plurality of first capacitors which may be coupled between a first terminal (hereinafter, referred to as a source for illustration purposes only) and a body terminal of each of the first switch elements 510, and the transmit switch unit 600 may further include a plurality of second capacitors which may be coupled between a second terminal (hereinafter, referred to as a drain for illustration purposes only) and a body terminal of each of the second switch elements 610.

Meanwhile, the receive switch unit 500 may conduct/connect or block a signal transfer path between the receive port 11 and the common port 10 by receiving a first gate signal from a plurality of first gate resistors.

The transmit switch unit 600 may conduct/connect or block a signal transfer path between the transmit port 12 and the common port 10 by receiving a second gate signal from a plurality of second gate resistors.

In this case, the radio frequency switch according to another exemplary embodiment in the present disclosure may further include a plurality of body resistors connected to the body terminal of each of the first and second switch elements 511 and 611.

In addition, the plurality of first and second switch elements 511 and 611 may be, for example, but not limited to a field effect transistor (FET) or a bipolar junction transistor (BJT).

The radio frequency switch according to another exemplary embodiment in the present disclosure may include the receive switch unit 500 in which the plurality of first switch elements 511 having the first capacitor coupled between the source and the body terminal are connected to each other in series, and the transmit switch unit 600 in which the plurality of second switch elements 611 having the second capacitor coupled between the drain and the body terminal are connected to each other in series. Accordingly, in the exemplary embodiment of the present disclosure, a voltage difference between the source/drain and the body terminal of each of the first and second switch elements may be reduced to allow a voltage distribution to be uniformly performed. Therefore, secondary harmonic characteristic may be improved.

Figure 12:
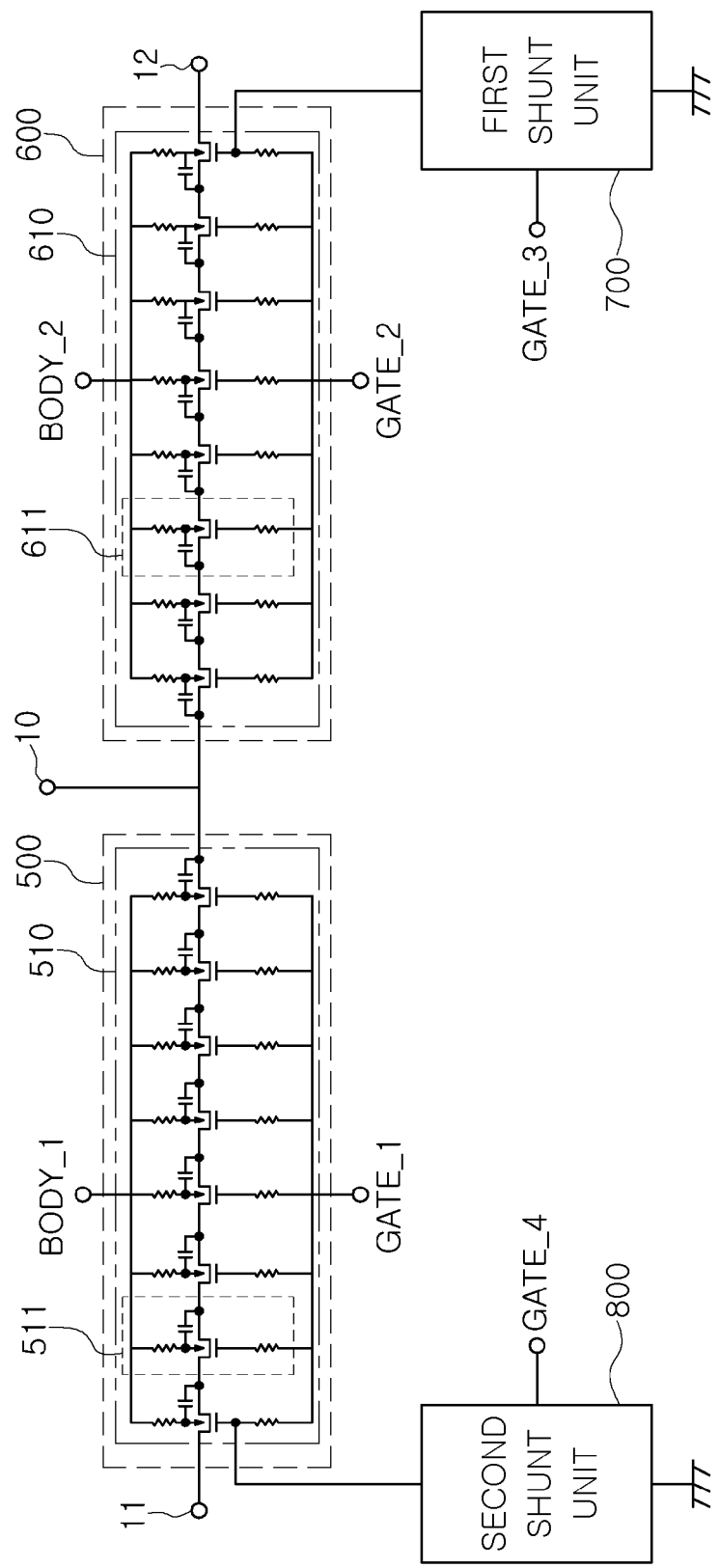
FIG. 12 is a block diagram illustrating a radio frequency switch comprising a shunt unit according to another exemplary embodiment in the present disclosure.

FIG. 12 is a block diagram illustrating a radio frequency switch having a shunt unit according to another exemplary embodiment of the present disclosure.

Figure 13:
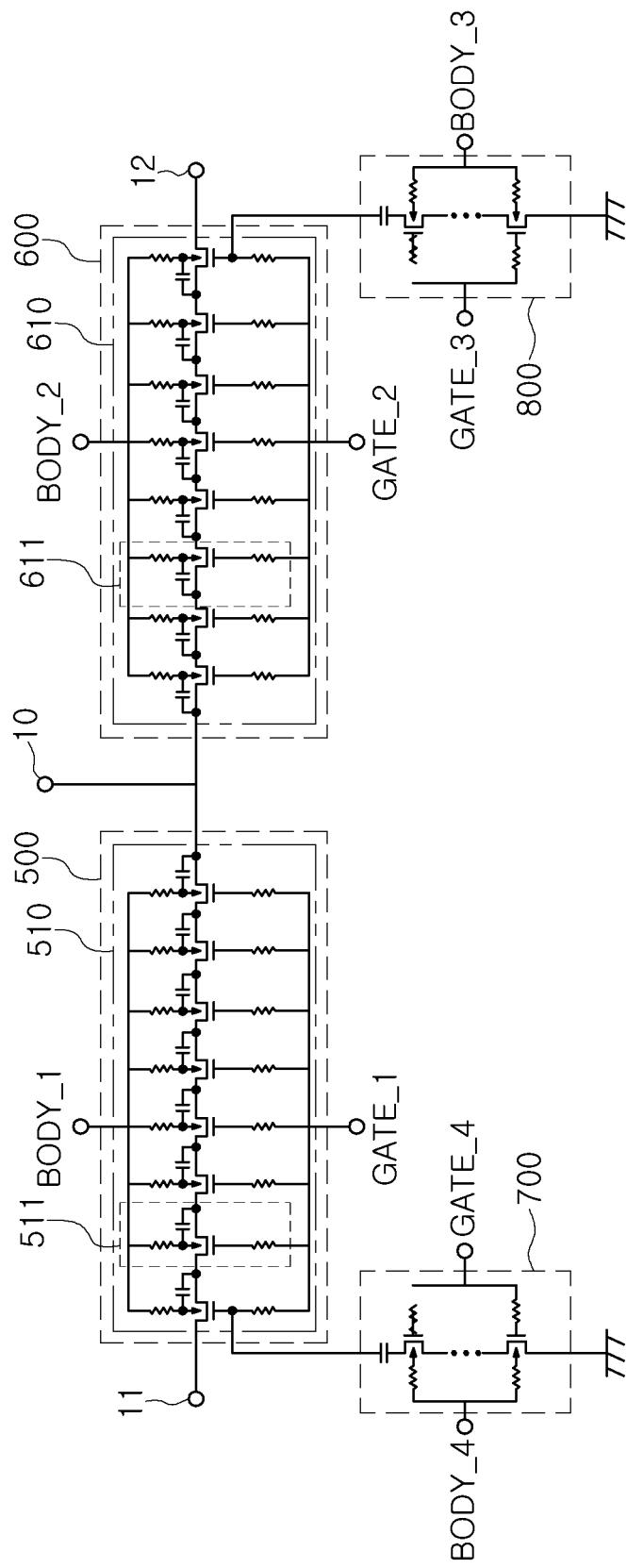
FIG. 13 is a circuit diagram illustrating the radio frequency switch illustrated in FIG. 12 in more detail.

FIG. 13 is a circuit diagram illustrating the radio frequency switch illustrated in FIG. 12 in more detail according to another exemplary embodiment of the present disclosure.

Referring to FIG. 12, the radio frequency switch according to another exemplary the present disclosure may further include a first shunt unit 700 and a second shunt unit 800.

The first shunt unit 700 may be connected to a control terminal of a second switch element which may be connected to be the closest to the transmit port 12 among a plurality of second switch elements. In addition, the first shunt unit 700 may conduct/connect or block a signal transfer path between the transmit port 12 and the ground.

The second shunt unit 800 may be connected to a control terminal of a first switch element which may be connected to be the closest to the receive port 11 among the plurality of first switch elements. In addition, the second shunt unit 800 may conduct/connect or block a signal transfer path between the receive port 11 and the ground.

Referring to FIG. 13, the first shunt unit 700 may include a plurality of switch elements which may be connected to each other in series. In this case, one or more of the plurality of switch elements included in the first shunt unit 700 may be, for example, but not limited to, a body contact type of switch element in which a body resistor element is connected to the body terminal.

Meanwhile, the second shunt unit 800 may include a plurality of switch elements which may be connected to each other in series. In this case, one or more of the plurality of switch elements included in the second shunt unit 800 may be, for instance, but not limited to, a body contact type of switch element in which a body resistor element is connected to the body terminal.

In the radio frequency switch according to the exemplary embodiment of the present disclosure, the second and first shunt units 800 and 700 may be connected to the receive and transmit switch units 500 and 600, respectively, whereby isolation characteristic may be improved. Since a description thereof is the same as or substantially similar to that described above in FIG. 10, it will be omitted.

As set forth above, according to some exemplary embodiments in the present disclosure, the radio frequency switch may include at least one switch element including the feed-forward capacitor connected between the source/drain and the body terminal of the transmit and receive switch units, respectively, whereby secondary harmonic characteristic and linearity characteristic may be improved.

While exemplary embodiments have been shown and described above, it will be apparent to those skilled in the art that modifications and variations could be made without departing from the scope of the present invention as defined by the appended claims.

What is claimed is:

1. A radio frequency switch, comprising:
   a common port transmitting and receiving a radio frequency signal;
   a receive switch unit including a first switch unit having a plurality of first switch elements which are connected to each other in series and a second switch unit having a plurality of second switch elements which are connected to each other in series; and
   a transmit switch unit including a third switch unit having a plurality of third switch elements which are connected to each other in series and a fourth switch unit having a plurality of fourth switch elements which are connected to each other in series,
   wherein the receive switch unit further includes a plurality of first capacitors each connected between a first terminal and a body terminal of each of the first switch elements, and the transmit switch unit further includes a plurality of second capacitors each connected between a second terminal and a body terminal of each of the third switch elements.

2. The radio frequency switch of claim 1, wherein each of the first to fourth switch elements further includes a body resistor element connected to the body terminal of each of the first to fourth switch elements.

3. The radio frequency switch of claim 1, wherein:
   the first and second switch units further include a plurality of first resistor elements connected in series to a control terminal of each of the first and second switch elements, and
   the third and fourth switch units further include a plurality of second resistor elements connected in series to a control terminal of each of the of third and fourth switch elements.

4. The radio frequency switch of claim 1, wherein:
   the receive switch unit has the first switch unit connected to be closer to the common port than the second switch unit, and
   the transmit switch unit has the third switch unit connected to be closer to the common port than the fourth switch unit.

5. The radio frequency switch of claim 1, wherein at least one or more of the first to fourth switch elements are a field effect transistor (FET) or a bipolar junction transistor (BJT).

6. The radio frequency switch of claim 1, further comprising:
   a first shunt unit connected to a control terminal of the fourth switch element connected to be the closest to the transmit port among the plurality of fourth switch elements and conducting or blocking a signal transfer path between the transmit port and a ground; and
   a second shunt unit connected to a control terminal of the second switch element connected to be the closest to the receive port among the plurality of second switch elements and conducting or blocking a signal transfer path between the receive port and the ground.

7. A radio frequency switch, comprising:
   a common port transmitting and receiving a radio frequency signal;
   a receive switch unit having a plurality of first switch elements which are connected to each other in series and conducting or blocking a signal transfer path between a receive port inputting and outputting the radio frequency signal and the common port; and
   a transmit switch unit having a plurality of second switch elements which are connected to each other in series and conducting or blocking a signal transfer path between a transmit port inputting and outputting the radio frequency signal and the common port,
   wherein the receive switch unit further includes a plurality of first capacitors each coupled between a first terminal and a body terminal of each of the first switch elements, and the transmit switch unit further includes a plurality of second capacitors each coupled between a second terminal and a body terminal of each of the second switch elements.

8. The radio frequency switch of claim 7, wherein:
the receive switch unit includes a plurality of first gate resistors connected in series to a control terminal of each of the plurality of first switch elements,
the transmit switch unit includes a plurality of second gate resistors connected in series to a control terminal of each of the second switch elements, and
the receive switch unit receives a first gate signal from the first gate resistors and conducts or blocks the signal transfer path between the receive port and the common port, and the transmit switch unit receives a second gate signal from the second gate resistors and conducts or blocks the signal transfer path between the transmit port and the common port.

9. The radio frequency switch of claim 7, further comprising a plurality of body resistors connected to a body terminal of each of the first and second switch elements.

10. The radio frequency switch of claim 7, wherein each of the plurality of first and second switch elements is a field effect transistor (FET) or a bipolar junction transistor (BJT).

11. The radio frequency switch of claim 7, further comprising:
a first shunt unit connected to a control terminal of the second switch element connected to be the closest to the transmit port among the plurality of second switch elements and conducting or blocking a signal transfer path between the transmit port and a ground; and
a second shunt unit connected to a control terminal of the first switch element connected to be the closest to the receive port among the plurality of first switch elements and conducting or blocking a signal transfer path between the receive port and the ground.

* * * * *